United States Patent Office 2,806,779
Patented Sept. 17, 1957

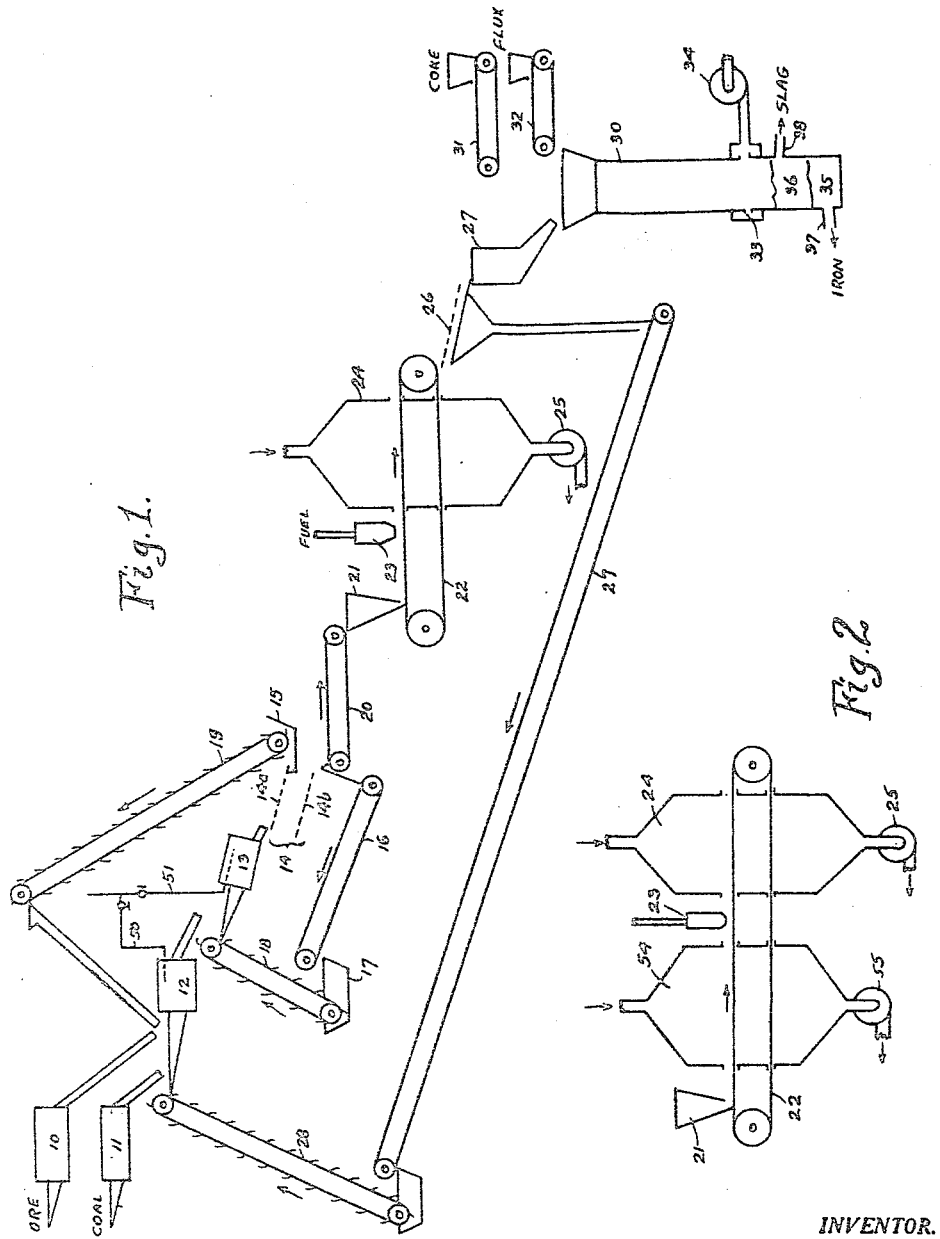

2,806,779
METHOD OF PRODUCING IRON

Samuel L. Case, Bexley, Ohio, assignor, by mesne assignments, to McWane Cast Iron Pipe Co., Birmingham, Ala., a corporation of Alabama Application September 29, 1953, Serial No. 383,083

7 Claims. (Cl. 75—33)

This invention relates to the art of producing iron from ore and a solid reducing agent, by forming a mixture thereof into conglomerates, whereupon these conglomerates are ignited under a forced draft of air and caused to become partially reduced and strongly bonded in a first heating operation, and thereafter these conglomerates are further heated in a smelting furnace for effecting final reduction, melting, carburizing, and delivering of molten iron as the product.

A feature of the invention is a method of producing iron from iron ore and solid carbonaceous reducing agent by the steps of forming self-sufficient conglomerates, then igniting these conglomerates under a forced draft of air and causing them to undergo destructive distillation of the carbonaceous ingredient, thus converting the conglomerate into a product hereinafter referred to as coherently char-bonded ferriferous pellets in which part of the iron oxide has been reduced to the metallic state, thereafter heating the coherent pellets for completing the reduction and melting, all in the presence of sufficient originally-present carbon for the thermal bonding and reduction operations and effective upon the melted metal for carburizing the same. The terms "char-bonded pellets" and "char-bonded material" are used in this disclosure to describe the strongly bonded residue obtained by destructive distillation of carbon-rich conglomerates of iron ore and fuels such as coal, to obtain a graphitic matrix, as can be accomplished under the herein-specified conditions in a machine similar to that used for the production of conventional iron ore sinters.

Another feature is a method of producing pig iron from iron ore and carbonaceous reducing agent without the employment of a conventional blast furnace, and under conditions permitting economical small tonnage operations in a continuous process at a regular rate and also permitting shut-downs and slow-downs during operation.

Another feature of this invention is the production of pellets having a graphitic matrix, from originating mixtures of fines of iron ore and either non-coking coals or blends of coking and non-coking coals.

A feature of the invention is the provision of self-sufficient pellets having a graphitic matrix and containing iron ore, the proportions being so balanced that the mixture is self-reducing when brought to reactive temperature and containing carbon in quantity for effecting the desired carburizing of the iron.

Another feature of the invention is the provision of self-sufficient conglomerated bodies of ferriferous matter having coherently-bonding graphitic matrices having within themselves sufficient carbon for the final reduction and carburizing into a pig-iron product and being of strength competent to withstand the pressures and conditions incident to charging, heating, and rapid reduction and melting in a smelting furnace.

A further feature is the provision of coherent conglomerated bodies of an intimate mixture of iron ore, carbonaceous reducing agent, and including reduced iron, and competent of being reduced and melted while retaining coherent and gas permeable condition until melted whereby the reduction and melting are effected rapidly and within a short travel distance in the smelting furnace.

A further feature is a method of producing iron from iron ore and carbonaceous reducing material in which the reduction is accomplished in two separated hot operations, and wherein the ore and reducing agent fines are formed into moist conglomerated bodies and treated in a hot zone for drying, destructive distillation of the carbonaceous ingredient, and a partial but incomplete reduction of the iron ore; char-bonded pellets with graphitic bonding matrices produced in the first hot stage are thereafter treated in a second hot zone for final reduction and melting, wherein the heat and gases from the melting are usefully employed in effecting completion of the reduction and preheating to melting temperature; together with the maintenance through the operation of original carbon of the mixture in intimate contact with the ore and reduced iron whereby carburization is accomplished and reoxidation effects controlled so that the total residence in the final reduction and heating zone is short.

The term "self-reducing" is employed in this disclosure as defining a chemical ratio in the char-bonded pellets by which enough carbon is intimately mixed with the iron ore to reduce to metallic form the iron oxide contained in the char-bonded pellets under the conditions of reduction in the smelting furnace. By "conglomerate" or "conglomerated body" herein is meant a coherent mass containing an intimate mixture of ore and reducing agent so proportioned to one another that the self-sufficient condition is attained: such terms being employed herein to define the mass in its heat-treated form referred to as a "char-bonded pellet" or "char-bonded materials."

Illustrative practice of the invention is set out on the accompanying drawing, in which:

Figure 1 is a conventionalized diagram showing successive steps of operation;

Figure 2 is a view showing a modified heating structure in which a modified form of operation can be accomplished.

EXAMPLE 1

In Figure 1, a supply of iron ore (Benson magnetite concentrates) is prepared in the grinding mill 10 in the form of a substantially dry powder. Analysis of the ore and its grain size after grinding are as follows:

*Composition of ore*

| | Percent on dry basis |
|---|---|
| Total iron | 61.6 |
| Mn (estimated) | 1.0 |
| $SiO_2$ | 7.3 |
| $Al_2O_3$ | 3.7 |
| CaO | 0.16 |
| MgO | 0.18 |
| $TiO_2$ | 0.80 |

*Screen-size distribution of ground ore*

| Mesh size of screen: | Percent retained |
|---|---|
| +60 | 2.64 |
| −60+70 | 2.56 |
| −70+100 | 9.24 |
| −100+150 | 11.16 |
| −150+200 | 13.44 |
| −200+325 | 14.16 |
| −325 | 46.8 |

Similarly, a Book Cliff coal, denominated non-coking by commercial standards, is ground in a grinding mill 11. The analysis of the coal and its grain size after grinding are as follows:

Composition of coal

| | Percent on dry basis |
|---|---|
| Volatile matter | 37.8 |
| Fixed Carbon | 56.2 |
| Ash | 6.2 |
| Sulfur | 0.62 |

Composition of coal ash

| | Percent of dry coal |
|---|---|
| CaO | 0.47 |
| MgO | under 0.01 |
| $SiO_2$ | 1.7 |
| $Al_2O_3$ | 2.7 |

Screen-size distribution of ground coal

| Mesh size of screen: | Percent retained |
|---|---|
| +48 | 0.0 |
| −48+65 | 0.08 |
| −65+100 | 0.9 |
| −100+150 | 18.25 |
| −150+200 | 53.75 |
| −200 | 27.02 |

Ground particles of ore and coal from the grinding mills 10 and 11 are conveyed to a mixer 12 where they are intimately mixed. The outputs of the mills 10 and 11 are regulated to obtain the desired ratio of ore and coal, for example, 60 parts of ore fines to 40 parts of coal fines by weight. Ten to twenty percent by weight of water is introduced at the mixer by pipe and spray 50, about 15 percent being preferred so that the mixture is moist, but not wet and coherent. Mixtures containing less than 10 percent water have been found to yield pellets too low in strength in the next processing step. Mixtures containing more than about 20 percent water have been found to produce pellets that are too wet and soft in the next processing step.

The contents of the mixer 12 are introduced at a regulated rate into the upper end of a pelletizing drum 13 having, for example, a diameter of 4 feet and a length of 8 feet, rotating about an axis slightly inclined downward toward the discharge end, for example, at 7 degrees from horizontal, and rotating at a peripheral speed of about 220 feet per minute. Water is sprayed into the pelletizing drum near its higher or charging end, by a pipe and spray 51, to an amount of about 2 percent by weight of the incoming mixture of ore and coal fines to cause pellets to form. As the drum turns, initial small conglomerates form and roll over and over upon the remaining material introduced from the mixer 12 and gradually build up into compact balls or spheres increasing in size and rolling toward the lower discharge end of drum 13.

As the pellets roll from the drum 13, they pass onto a double screen 14 having an upper perforated surface 14ᵃ which retains pellets having a size larger than ⅝ inch diameter and delivering these into catch trough 15. The lower perforated surface 14ᵇ of the double screen 14 retains pellets having a size greater than ⅜ inch diameter but less than ⅝ inch diameter and permitting smaller pellets and mixture fines to pass onto conveyor 16. Illustratively, the double screen 14 may have a length of 47 inches, a width of 12 inches, a slope of 21 degrees from horizontal, and a square mesh of ¾ x ¾ inch in the upper screen.

Fines falling onto the conveyor 16 are delivered to a catch trough 17 and then by a conveyor 18 are returned into the feed end of the pelletizing drum 13 where they are permitted to build up to the desired size. Oversized pellets from the upper screen of the double screen 14 are delivered into a catch trough 15 and then delivered by way of a conveyor 19 into the feed end of the mixer 12 where they are broken and redistributed during the preparation of the charge for the pelletizing drum 13.

Pellets of the desired size from the double screen 14 are permitted to fall onto a conveyor 20 which delivers them to a hopper 21.

In operation of the pelletizing drum 13 and the double screen 14, pellets up to the desired size of ⅜ to ⅝ inch diameter form slowly for 20 to 30 minutes after the pelletizing operation is started. During this time, a large proportion of the mixture of fines being fed into the pelletizing drum 13 is recirculated through the drum and the double screen 14 by means of the conveyors 16 and 18 and the catch trough 17. After 30 to 45 minutes of operation, pellets of the desired size form readily at the rate of 3000 pounds per hour in continuous operation.

The pellets as delivered into the hopper 21 are self-sufficient and self-reducing and have strengths adequate to resist the pressures and heating conditions encountered in the first heating operation. The pellets are fed continuously from the hopper 21 onto a traveling grate 22 in a layer 3 to 5 inches deep.

As the pellets are conveyed by the traveling grate 22, they are ignited by an igniter 23 and move continuously through a heating zone illustratively defined by windbox jacket 24. The pellets are brought up to a temperature of 2000 to 2300° F. (i. e. below the slagging temperature of the material, noting the absence of added flux in this example), by an oxygen-bearing blast drawn through jacket 24 by a suction fan 25 at an air rate of about 40 cubic feet per minute per square foot of grate area. This causes a drying of the pellets, followed by destructive distillation of the coal, and therewith carbon within the individual pellets effects a preliminary reduction of, say, 10 to 50 percent of the iron oxide and causes the mass to form a char-bonded pellet having a bonding graphitic matrix of unexpected strength and unusually high carbon content. The heating and blast time on the traveling grate from ignition of the green pellets to discharge of the char-bonded material is about 8 to 12 minutes.

Char-bonded pellets from the traveling grate 22 are continuously discharged onto a screen 26 having ¼ inch opening. Fines of char-bonded material passing through the screen 26 are allowed to fall onto a conveyor 27 and thence move to a conveyor 28 which conveys them to the feed end of the mixer 12 where they are incorporated in the feed for the pelletizing drum 13. Oversize char-bonded material from the screen 26 is discharged, cooled in air in a few seconds to a low red heat, and may be stored or passed to a hopper 29 for regulated delivery to the smelting furnace 30.

The char-bonded material entering the hopper 29 is of such strength and quality that it will withstand the pressures, loads and conditions existing in a smelting furnace having a charge height of, for example, 8 feet. When it enters at high temperature, in a continuous operation, reduction continues in the pellets. The quality of the bonded pellets may be defined by (1) yield index, (2) degree of reduction, and (3) attained reducibility.

By "yield index" is meant a number corresponding to the percentage of the char-bonded material which is retained on a 4-mesh screen. That is, "yield index" represents the amount of char-bonded pellets from the traveling grate which is suitable for charging and use in the smelting furnace without excessive loss of fines as flue dust.

By "degree of reduction" is meant a number corresponding to the percentage of total iron which has been reduced to metallic iron during the first heating operation, and is the ratio of the metallic iron in the char-bonded pellets to total iron in the char-bonded pellets, expressed in percentage by weight.

Degree of reduction, percent =

$$\frac{\text{Metallic iron in char-bonded material}}{\text{Total iron in char-bonded material}} \times 100$$

By "attained reducibility" is meant a number corresponding to the percentage of the original iron in the pellets which upon final reduction will yield metallic iron by the action of the carbon remaining in the pellets. Attained reducibility is calculated according to the following formula:

Attained reducibility, percent =

$$\frac{3.5 \text{ (percent carbon in char-bonded material)} + \text{(percent metallic iron in char-bonded material)}}{\text{Percent total iron in char-bonded material}} \times 100$$

It may be noted that a value of attained reducibility in excess of 100 may occur, indicating that excess coal has been employed in the original mixture and retained during the first heating and is available for carburizing and heating. A typical composition of char-bonded pellets prepared in this manner is as follows:

| | | |
|---|---|---|
| Total iron in char-bonded pellets | percent | 56 |
| Metallic iron in char-bonded pellets | do | 17 |
| Carbon in char-bonded pellets | do | 15 |
| Degree of reduction | do | 30 |
| Yield index | | 75 |
| Attained reducibility | percent | 124 |

The fact that green pellets containing up to 40 percent non-coking coal can be heated in an oxygen-bearing blast to yield strong and coherent char-bonded pellets high in residual carbon is an unexpected phenomenon because it is contrary to all the known teachings. It has been thoroughly established and is generally accepted that when the fuel content in an original mixture of iron ore and fuel exceeds about 12 to 15 percent, and such mixture subjected to conventional sintering practices, the combustion of fuel continues until nearly all the fuel is consumed, so that regardless of the original fuel content in the mixture, the residual fuel content after heating is roughly under one percent. Strong and coherent bonded material, high in residual carbon, results from specific control of the heating operation, as detailed in this disclosure.

To the unaided eye, a char-bonded pellet appears to be a dense, strongly coherent body of amorphous carbon, greatly resembling charcoal, without any visible indication of the presence of fused material at the surface or in a broken fragment. Under the microscope, particularly at high magnification, the structure of the pellet is not homogeneous but consists of four major constituents:

1. A sponge-like, graphitic-carbon matrix. The porosity in this carbon matrix is microscopic, the largest pores being of the order of 0.0025 inch in diameter.

2. Minute particles of metallic iron ranging in size from 0.00001 to 0.00005 inch, often forming a border around larger (about 0.003-inch diameter) grains of iron oxide.

3. Grains of iron oxide dispersed in the carbon matrix. At magnifications lower than 500 diameters and under ordinary illumination, these oxide grains appear to be homogeneous; but under polarized light and higher magnification, the oxide grains show a distinct duplex structure, with extremely fine veins of metallic iron crisscrossing the oxide.

4. Chains or groupings of very small irregular-shaped islands of ore gangue, showing no indication of fusion.

A most unique feature of the structure of the char-bonded pellets, revealed by the microscopic examination under polarized light, is the fact that the carbon matrix consists of finely crystalline graphitic carbon, rather than amorphous carbon. The usual charred product of low-temperature carbonization of coal is 100 percent amorphous carbon, while "coke," the product of high-temperature carbonization of coal, is at most about 10–20 percent graphitic carbon and the balance amorphous carbon. From experience in the manufacture of graphitic electrodes, it is accepted that conversion of amorphous carbon to graphitic carbon requires a very long heating cycle (4–6 days) at very high temperatures (about 3600 degrees F.). It is, therefore, totally unexpected to find that, in the production of char-bonded material, a heating cycle of only a few minutes at a temperature of about 2100–2200 degrees F. in a draft of air is sufficient to complete conversion of the amorphous carbon into finely crystalline graphitic carbon, noting that the graphite obtained on very long heating at high temperatures has a coarsely crystalline grain structure. The reasons for this phenomenon are not clear. Conceivably, the extreme fineness of the coal particles and their intimate contact with very fine iron oxide particles (which may have a catalytic effect), coupled with the extremely high rate of heating, is a key to the explanation.

The bulk density distinguishes the product from charcoal and coke, with the bulk density of metallurgical coke being about 27 pounds per cubic foot or about 81 percent of total voids, of which 45 percent is space between particles and 36 percent voids within particles. The char-bonded pellets have 74 percent of total voids of which about 29 percent are within the particles: with a bulk density of 75 pounds per cubic foot. The large bubbles visible on lumps of coke are absent from the char-bonded material.

Char-bonded material from the hopper 29 is delivered into the top of a smelting furnace 30. Suitably sized coke for thermal and supporting effects is delivered by a conveyor 31 into the smelting furnace. Likewise, a suitable flux is delivered by a conveyor 32 into the smelting furnace. Typical charges to a 10-inch-diameter smelting furnace are:

| Material | Weight, lb. | Size, in. |
|---|---|---|
| Char-bonded material | 15 | ¾ x ¾ |
| Coke | 4 | ¾ x 1¼ |
| Limestone | 3 | ¾ |
| Fluorspar | 0.35 | ¾ |

A blast of air is delivered into the smelting furnace 30 through tuyeres 33 from a blower 34 and moves upward through the furnace charge causing combustion of the coke for thermal effects and the melting of the iron in the lowermost and reduced char-bonded material, wherewith the molten iron forms in a pool in the bottom 35 of the furnace with an overlying layer 36 of slag formed from the gangue and fluxing agents. The metallic iron is carburized by reaction at the melting zone with the residual carbon contiguous to it and the carburization is completed as the molten iron drips through the underlying bed. The reaction upon the iron ore, during its reduction, produces carbon oxides, largely carbon monoxide. The air blast acts on carbon remaining in the lowermost and reduced char-bonded material and on the thermal coke in the illustrative example of internal heating of the smelting zone, to form carbon dioxide gas which upon further reaction with hot solid carbon will form carbon monoxide gas. The carbon monoxide moves upwardly through the overlying charge at a temperature such that iron oxide in the pellets in the successive upward parts of the charge is caused to undergo reduction by the joint action of this carbon monoxide and the carbon contained in the char-bonded pellets, but essentially without melting or substantial weakening of the pellets as they move downward in the smelting furnace toward the melting zone. The metal can be drawn off at a tap hole 37 and the slag at a slag hole 38.

Illustratively, the smelting furnace 30 may have an internal diameter of 10 inches and a height of 8 feet above the tuyeres, and operate at a rate of 110 pounds of iron per square foot of hearth area per hour. As much as 99 percent of the total iron contained in the pellets passing through the furnace was recovered as metallic iron.

Illustrative conditions under which the 10-inch smelting furnace was operated were:

Blast rate_____ 9 to 13 lbs. of air per minute
Oxygen content of blast_____ 21 to 30 percent
Temperature of blast_____ 900° F.
Moisture content of blast____ 35 grains per pound of air
Type of furnace lining_____ Siliceous, dolomitic or carbonaceous

*Composition of iron produced*

| | Percent |
|---|---|
| Total carbon | 2.5 to 4.2 |
| Silicon | 0.3 to 1.2 |
| Manganese | 0.09 to 0.24 |
| Phosphorus | 0.03 to 0.09 |
| Sulfur | 0.05 to 0.30 |

*Composition of slag produced*

| | Percent |
|---|---|
| CaO | 15 to 47 |
| SiO | 10 to 43 |
| MgO | 5 to 19 |
| $Al_2O_3$ | 5 to 14 |
| FeO | 1 to 5 |

The total smelting time for the self-sufficient self-reducing char-bonded pellets, i. e. the residence time in the furnace from the charging surface to the tuyeres, was found to be about 30 minutes, while in conventional blast furnaces the time is measured in hours. The self-sufficient bonded material thus greatly influences the kinetics of the smelting porcess, as compared with a burden of conventional ore agglomerates and coke.

The rate of production of molten iron is significantly increased by increasing the diameter of the smelting furnace. For example, in a smelting furnace with an internal diameter of 18 inches, the production rate exceeded 130 pounds of iron per square foot of hearth area per hour.

The individual operations in this process may be conducted by continuous runs or by batch operation, and the several steps may be performed independently with several pelletizing units and several heating units delivering bonded pellets for use in a single smelting furnace. The bonded material may be cooled and shipped to a different plant for reduction in a smelting furnace. Thus, the bonded pellet is a strong and resistant article of manufacture which, separated from fines, may be shipped by freight car, its integrity permitting charging into furnaces upon addition of flux and fuel in quantities to liquidize the gangue; noting that the bonded material so prepared is self-reducing and self-sufficient in that it contains sufficient carbon for reduction of the iron to metal and for carburizing the metal thus formed. Alternately, as shown in Figure 1, the heat may be retained in the hot char-bonded material discharged from the traveling grate by charging the bonded pellets directly from the traveling grate into the smelting furnace. As another alternative, the hot bonded pellets may be discharged from the traveling grate into a separate holding furnace in which the material may be further heated by waste gases from the smelting furnace for a time sufficient to increase the degree of reduction of the char-bonded material.

A notable condition of operation is that under the stated conditions of operation, the heating steps can be conducted at individually optimum rates for the equipment and material used, and individually operated and stopped as desired. Thus, with a blowing time of 15 minutes or less (usually below 10 minutes as shown by later examples) on a traveling grate for the char-bonding operation, and a residence time of 30 minutes in the smelting furnace, a full shut-down can be effected in less than an hour from the time pelletizing in the rotary drum is stopped: and full re-starting can be accomplished in a like time. Similar shut-downs, at corresponding time demands, can be accomplished when the char-bonding and smelting are accomplished at different points. In this respect, the procedure is strikingly different from that with the conventional blast furnace, where the plant must be continuously operated for long periods of time, particularly noting that the residence time therein is measured in hours. The intermittency permitted is of high value for small reduction plants.

EXAMPLE 2

In the manufacture of self-sufficient bonded pellets in Example 1, pellets of bonded material were delivered from the hopper 21 onto the traveling grate 22 at such a rate as to form a uniform bed of 3 to 5 inches depth, after which the pellets were ignited. Alternatively, a drying section 54 may be incorporated between the hopper 21 and the igniter 23 and supplied with hot gas from a chamber 56 by action of the suction fan 55: hot gases from fan 24 may be used. It is not feasible to predry the pellets before placement in the hopper 21 because in their dry un-carbonized state, pellets have less strength. Predrying must be accomplished in such a manner that mechanical handling of dry un-carbonized pellets can be avoided before the first heating or destructive distilling and thermal bonding operation. Predrying may be accomplished by passing, through the bed of green pellets on the traveling grate, hot air or products of combustion. The effect of predrying is to decrease the time necessary for heating after ignition of the pellets. Examples of the effects of predrying on heating time after ignition are shown in the following table. These results were obtained on batch-type grates.

| Test No. | Type of pellet | Size of pellet, inch | Heating time, min. | Composition of Bonded Material | | | | |
|---|---|---|---|---|---|---|---|---|
| | | | | Total Iron, percent | Metallic Iron, percent | Carbon, percent | Yield Index | Attained Reducibility, percent |
| 105 | Green | ½ x ⅝ | 21½ | 58.5 | 25.4 | 11.5 | 66 | 116 |
| 106 | Dry | ½ x ⅝ | 10½ | 58.0 | 31.4 | 11.5 | 58 | 123 |
| 107 | Green | ⅝ x ¾ | 28 | 57.0 | 25.9 | 15.7 | 69 | 142 |
| 109 | Green | ¾ x ⅞ | 30 | 53.2 | 17.5 | 17.5 | 66 | 148 |
| 110 | Dry | ¾ x ⅞ | 12 | 54.9 | 15.7 | 15.1 | 78 | 125 |
| 111 | Green | ⅞ x 1 | 24 | 56.4 | 15.7 | 11.9 | 65 | 102 |
| 112 | Dry | ⅞ x 1 | 13 | 52.2 | 25.2 | 18.2 | 77 | 170 |

EXAMPLE 3

The quality of the char-bonded pellets is determined by the three indexes given in Example 1, and this quality may be attained by controlling the variables of (1) composition of the originating mixture, (2) pellet size, (3) blast rate during the first heating operation, (4) elapsed blowing time during the first heating operation, (5) final grate temperature, (6) blast temperature during the first heating operation, (7) oxygen content of the blast during the first heating operation, and (8) depth of pellets on the traveling grate during the first heating operation.

Composition of the originating mixture refers in part to the ore/coal ratio which may be, for example, 60 parts of ore to 40 parts of coal, 70 parts of ore to 30 parts of coal, etc., several examples of which are shown below:

| Test No. | Composition of Original Mixture by weight ore/coal | Composition of Bonded Material | | | | |
|---|---|---|---|---|---|---|
| | | Total Iron, percent | Metallic Iron, percent | Carbon, percent | Yield Index | Attained Reducibility, percent |
| 103 | 85-15 | 48.5 | 10.1 | 18.8 | 66 | 156 |
| 8 | 80-20 | 40.3 | 1.0 | 26.5 | | 233 |
| 6 | 70-30 | 51.0 | 9.2 | 17.8 | | 140 |
| 10 | 60-40 | 51.0 | 30.4 | 26.3 | | 240 |
| 16 | 50-50 | 46.8 | 23.5 | 32.5 | | 292 |

Composition of the originating mixture also refers in part to the nature of the iron ore used. For example, many direct shipping ores, ore concentrates, and flue dusts will provide satisfactory raw material for this process. For example, satisfactory bonded pellets have been made using Mesabi hematite ore. Composition of this ore and its screen-size distribution after grinding were as follows:

*Composition of ore*

Percent on natural basis

Fe .................................................. 50.2
Mn .................................................. 0.6
$SiO_2$ .................................................. 14.1
$Al_2O_3$ .................................................. 2.0
CaO .................................................. 0.57
MgO .................................................. 0.30
Moisture .................................................. 8 to 12

*Screen-size distribution of ground ore*

Mesh size of screen:                    Percent retained
+65 .................................................. 1.1
−65+100 .................................................. 2.3
−100+200 .................................................. 8.0
−150+200 .................................................. 11.3
−200 .................................................. 77.3

The carbonaceous material in Example 1 is stated as non-coking coal; coking and weakly coking coals also may be used. Thus, Columbia and Horse Canyon coal has been used in both its fresh and weakly coking condition and in its weathered non-coking condition. Analyses of this coal and its screen size after crushing were as follows:

*Composition of Columbia and Horse Canyon coal*

Moisture content as received .................... percent .. 1.4
Free-swelling index .................................... No. 1½ to 2
Proximate analysis (dry basis):
   Volatile matter .................................... percent .. 37.5
   Fixed carbon ............................................... do .... 51.6
   Ash ............................................................... do .... 10.9
   Sulfur ........................................................... do .... 1.51
Composition of ash (percent of dry coal):
   CaO ............................................................. percent .. 0.53
   MgO ............................................................ do .... 0.12
   $SiO_2$ ............................................................ do .... 6.50
   $Al_2O_3$ ........................................................... do .... 3.55

*Screen-size distribution of ground coal*

Mesh size of screen:                    Percent retained
+65 .................................................. 1.1
−65+115 .................................................. 6.5
−115+140 .................................................. 6.7
−140+200 .................................................. 57.1
200 .................................................. 28.6

Examples of bonded material produced using Columbia and Horse Canyon coal as the carbonaceous material are as follows:

| Test No. | Ratio of Ore to Coal in Original Mixture | Composition of Bonded Material | | | |
|---|---|---|---|---|---|
| | | Total Iron, percent | Metallic Iron, percent | Carbon, percent | Yield Index |
| 92 | 80-20 | 60.5 | 13.7 | 4.0 | 75 |
| 94 | 80-20 | 62.8 | 16.5 | 3.7 | 78 |
| 95 | 80-20 | 63.0 | 13.1 | 5.0 | 71 |
| 97 | 80-20 | 64.1 | 12.9 | 3.0 | 76 |

It is furthermore considered within the scope of the invention that the carbonaceous material in the originating mixture can be supplied in the form of brown coal, and other such low-grade fuels.

Pellets measuring ⅜ to ⅝ inch were used in the illustrative form of practice in Example 1, but it is recognized that larger pellets have considerable merit in some types of smelting furnaces. For example, larger pellets provide greater gas permeability of the burden in a smelting furnace. Examples of larger pellets satisfactory for use in this process are given below, but even larger sizes may be used in some smelting furnaces without departing from the scope of this invention.

| Test No. | Pellet Diameter, inch | Composition of Bonded Material | | | | |
|---|---|---|---|---|---|---|
| | | Total Iron, percent | Metallic Iron, percent | Carbon, percent | Yield Index | Attained Reducibility, percent |
| 107 | ⅝ x ¾ | 57.0 | 25.9 | 15.7 | 69 | 142 |
| 110 | ¾ x ⅞ | 54.9 | 15.7 | 15.1 | 78 | 125 |
| 112 | ⅞ x 1 | 52.2 | 25.2 | 18.2 | 77 | 170 |
| 145 | ⅞ x 1 | 53.9 | 4.9 | 14.5 | 75 | 103 |
| 146 | ⅞ x 1 | 55.1 | 4.8 | 11.6 | 75 | 82 |
| 192 | ⅝ x ⅞ | 60.3 | 16.1 | 7.7 | 68 | 71 |
| 193 | ⅝ x ⅞ | 62.3 | 19.7 | 7.0 | 67 | 71 |
| 286 | ⅞ x 1 | 54.7 | 17.4 | 11.6 | 98 | 106 |
| 287 | ⅞ x 1 | 56.2 | 26.0 | 15.5 | 86 | 142 |

The blast rate during the first heating operation refers to the rate at which air (which term herein includes air modified by increased oxygen or by products of combustion) is forced through the pellets after ignition. With suitable control of the other heating variables (as detailed hereinafter), the blast rate may be varied as follows to produce char-bonded material of acceptable quality:

| Test No. | Blast Rate, C. F. M. per sq. ft. of grate area | Composition of Bonded Material | | | | |
|---|---|---|---|---|---|---|
| | | Total Iron, percent | Metallic Iron, percent | Carbon, percent | Yield Index | Attained Reducibility, percent |
| 249 | 25 | 49.4 | 6.5 | 23.2 | 85 | 178 |
| 226 | 40 | 55.5 | 18.3 | 19.7 | 82 | 157 |
| 275 | 55 | 56.6 | 17.0 | 18.8 | 83 | 146 |
| 128 | 65 | 54.4 | 18.5 | 17.4 | 72 | 146 |
| 203 | 76 | 55.2 | 21.7 | 15.1 | 79 | 135 |
| 131 | 80 | 54.9 | 19.4 | 14.5 | 80 | 128 |
| 148 | 101 | 54.9 | 19.0 | 11.8 | 78 | 110 |

Elapsed blowing time during the first heating operation is a function of the speed of travel of the continuous grate and, with suitable control of the other heating variables, may be varied to suit production requirements, as shown in the following table:

| Test No. | Blowing Time, min. | Blast Rate, c.f.m./sq. ft. | Composition of Bonded Material | | | | |
|---|---|---|---|---|---|---|---|
| | | | Total Iron, percent | Metallic Iron, percent | Carbon, percent | Yield Index | Attained Reducibility, percent |
| 5-C-2 | 4.0 | 55 | 51.3 | 9.6 | 19.6 | 76 | 152 |
| 4-C-4 | 4.8 | 33 | 59.0 | 18.9 | 11.5 | 78 | 100 |
| 4-C-3 | 5.1 | 33 | 57.0 | 21.2 | 13.9 | 76 | 114 |
| 4-C-2 | 5.7 | 43 | 55.5 | 13.0 | 15.1 | 78 | 119 |
| 7-C-2 | 8.4 | 43 | 54.3 | 8.8 | 14.7 | 71 | 111 |

Final grate temperature is extremely useful as a control measure over the quality of the bonded material. It is preferably in the range of 1600 to 2000° F. and affects the quality of the char-bonded material as shown in the following table:

| Test No. | Final Grate Temp., F. | Composition of Bonded Material | | | | |
|---|---|---|---|---|---|---|
| | | Total Iron, percent | Metallic Iron, percent | Carbon, percent | Yield Index | Attained Reducibility, percent |
| 130 | 1,400 | 55.0 | 2.7 | 13.7 | 70 | 92 |
| 225 | 1,600 | 52.0 | 12.1 | 16.1 | 78 | 132 |
| 226 | 1,800 | 55.5 | 18.3 | 19.7 | 82 | 157 |
| 227 | 2,000 | 52.9 | 15.5 | 15.8 | 81 | 134 |
| 127 | 2,010 | 56.3 | 16.8 | 12.9 | 69 | 110 |

Blast temperature during the first heating operation refers to the temperature at which the air blast or modified-air blast enters the bed of pellets after ignition, and an increase in blast temperature generally permits a decrease in blowing time required to produce char-bonded material of acceptable quality, as shown in the following table:

| Test No. | Blast Temp., F. | Blowing Time, min. | Composition of Bonded Material | | | | |
|---|---|---|---|---|---|---|---|
| | | | Total Iron, percent | Metallic Iron, percent | Carbon, percent | Yield Index | Attained Reducibility, percent |
| 206 | 70 | 10 | 58.3 | 20.1 | 13.1 | 72 | 113 |
| 226 | 500 | 7 | 55.5 | 18.3 | 19.7 | 82 | 157 |
| 244 | 1,000 | 7 | 49.4 | 13.6 | 19.3 | 80 | 164 |
| 147 | 1,470 | 6½ | 54.9 | 15.7 | 15.5 | 72 | 127 |

The oxygen content of the blast during the first heating operation may be increased by adding oxygen to the air blast, or may be depleted by adding to it products of combustion. Typical effects are illustrated in the following:

| Test No. | Oxygen in blast, percent by volume | Composition of Bonded Material | | | | |
|---|---|---|---|---|---|---|
| | | Total Iron, percent | Metallic Iron, percent | Carbon, percent | Yield Index | Attained Reducibility, percent |
| 153 | 4.2 | 55.0 | 12.1 | 9.1 | 76 | 80 |
| 151 | 8.2 | 55.0 | 17.1 | 10.0 | 78 | 95 |
| 150 | 11.8 | 55.0 | 16.2 | 10.0 | 80 | 93 |
| 275 | ¹16.0 | 56.6 | 17.0 | 18.8 | 83 | 146 |
| 226 | ¹21.0 | 55.5 | 18.3 | 19.7 | 82 | 157 |
| 234 | ¹26.0 | 53.8 | 15.8 | 18.7 | 85 | 151 |
| 179 | 32.0 | 61.6 | 10.5 | 3.4 | 76 | 36 |

¹ Condition yielding char-bonded material of acceptable quality.

The depth of pellets on the traveling grate affects the quality of the product and is preferably no more than 6 inches for ⅜ x ⅝ pellets, and may be deeper for larger pellets. Examples of various bed depths used to make bonded material of acceptable quality are as follows:

| Test No. | Pellet Size, inch | Bed Depth, inch | Composition of Bonded Material | | | | |
|---|---|---|---|---|---|---|---|
| | | | Total Iron, percent | Metallic Iron, percent | Carbon, percent | Yield Index | Attained Reducibility, percent |
| 6-C-2 | ⅜ x ⅝ | 4 | 56.9 | 14.2 | 13.0 | 78 | 105 |
| 4-C-2 | ⅜ x ⅝ | 3 | 55.5 | 13.0 | 15.1 | 78 | 119 |

In the first heating operation, after top ignition of the pellets, it is preferred to blow the air (or modified air blast) through the bed of pellets from the top downwardly, that is, in the same direction as the progress of the burning.

EXAMPLE 4

In the illustrative form of practice given in Example 1, the pellets were produced from the originating mixture in a green form by the operation of a pelletizing drum slowly rotating about a substantially horizontal axis, the drum being charged with originating mixtures of fine ore and carbonaceous material. It is also feasible to form the damp or wetted originating mixture into pellets, briquettes, extruded forms, and the like, by means of presses, briquetting rolls, extrusion mills, and the like, without departing from the scope of this invention. Also, conventional and common carbonaceous binders such as starch, pitch, tar, molasses, lignin products, and the like may be incorporated in the originating mixture to strengthen the green pellets or assist in their formation, but such additives are not necessary in the process.

EXAMPLE 5

In the illustrative form of practice as given in Example 1, a continuous operation has been described, but batch operation has likewise been successful and is included in this invention. For example, conglomerates consisting of green pellets have been successfully heated on both continuous traveling grates and stationary batch-type grates to produce char-bonded pellets of acceptable quality. The following table shows comparative results for bonded material made continuously and in batch operations.

| Test No. | Type of Grate | Bed Depth, inch | Blowing Time, min. | Composition of Bonded Material | | | | |
|---|---|---|---|---|---|---|---|---|
| | | | | Total Iron, percent | Metallic Iron, percent | Carbon, percent | Yield Index | Attained Reducibility, percent |
| 6-C-2 | Traveling | 4 | 4 | 56.9 | 14.2 | 13.0 | 78 | 105 |
| 203 | Stationary | 4 | 4 | 55.2 | 21.7 | 15.1 | 79 | 125 |

EXAMPLE 6

In the illustrative form of practice given in Example 1, the conglomerates were in the form of discrete individual bonded pellets. It is also feasible to compound the originating mixtures for green pellets in such a manner that the char-bonded material will consist of clusters of pellets, resembling bunches of grapes. Such clustering has been obtained by including coking coal as part of the originating mixture. For example, instead of using 40 parts of non-coking coal to 60 parts of ore, clustering of the pellets has been obtained by using 16 parts of coking coal, 24 parts of non-coking coal, and 60 parts of ore, that is, 40 percent of the coal in the mixture was coking coal.

Clustering of bonded pellets has also been obtained by sprinkling the layer of green or dried pellets on the traveling grate with powdered iron ore.

Clustering of char-bonded pellets has also been obtained by producing green pellets according to the procedures described in Example 1, but of a somewhat smaller size, transferring these green pellets to a second pelletizing drum fed with powdered iron ore and additional water, and permitting the iron ore to build up on the green pellets as a skin amounting to about 20 percent of the total weight of the finished green pellet.

Clustered masses of char-bonded pellets are of interest in this process because, when such clustered masses are charged into the smelting furnace, the permeability of the burden to passage of stack gases is increased over that obtained when discrete pellets or other conglomerates are used. The following table illustrates some of the procedures and treatments that have been used successfully to produce clustered bonded pellets of acceptable quality.

| Test No. | Composition of Bonded Material | | | | |
|---|---|---|---|---|---|
| | Total Iron, percent | Metallic Iron, percent | Carbon, percent | Yield Index | Attained Reducibility, percent |
| 60 parts of ore with a blend of 24 parts non-coking coal and 16 parts coking coal | | | | | |
| 301 | 53.4 | 14.6 | 18.2 | 72 | 147 |
| 302 | 55.3 | 15.1 | 13.5 | 77 | 118 |

| Test No. | Composition of Bonded Material | | | | |
|---|---|---|---|---|---|
| | Total Iron, percent | Metallic Iron, percent | Carbon, percent | Yield Index | Attained Reducibility, percent |
| "Duplex" pellets with a skin of iron ore amounting to 20 percent of the weight of the finished green pellet | | | | | |
| 304 | 53.5 | 14.0 | 19.1 | 77 | 167 |
| 305 | 55.5 | 15.9 | 13.5 | 79 | 127 |

EXAMPLE 7

In the operation of the smelting furnace as described illustratively in Example 1, several variations in practice have been employed successfully. Char-bonded material from the traveling grate can be discharged directly into the top of the smelting furnace without screening and while still at a temperature of about 1500 degrees F. However, under these conditions, flue-dust losses have been large, mainly because of fines produced during the manufacture of the bonded material. As another variation, hot bonded material from the traveling grate can be screened over a 4-mesh screen, as described in Example 1, and the oversize charged into the smelting furnace while still at a temperature of about 1500 degrees F. As a further variation, hot bonded pellets from the traveling grate can be cooled, screened while cold, and charged while at essentially room temperature into the smelting furnace. All three of these variations have successfully produced metallic iron in the smelting furnace. In the latter two variations, the fines passing through a 4-mesh screen are returned to the mixer and recirculated into the pelletizing operation.

In one type of operation while using hot screened bonded material as part of the charge for an 18-inch-diameter smelting furnace, the production rate exceeded 350 pounds of iron per square foot of hearth area per hour.

The height of stock of char-bonded pellets in the 10-inch-diameter shaft furnace can be varied from 3 feet to 8 feet above the tuyeres. In each case, the iron in the pellets has been reduced to metallic iron in the smelting furnace, but a height of about 6 feet appears to give the best operation of this furnace when using a cold charge of screened pellets.

The smelting furnace has been operated using acid linings based on the mineral silica, basic linings based on dolomite and magnesia, and neutral linings based on graphite. Fluxes consisting of limestone, silica, and fluorspar have been varied so as to produce both acid and basic metallurgical slags in the smelting furnace. It will be recognized by those skilled in the art that the metallurgical composition of the molten iron produced in the smelting furnace may be varied and controlled by the nature of the slag produced. Typical metallurgical slags produced in the smelting furnace are listed in the tabulation below:

| Heat No. | CaO | MgO | SiO$_2$ | Al$_2$O$_3$ | FeO | Basicity |
|---|---|---|---|---|---|---|
| 5 | 40.8 | 18.3 | 23.8 | 12.1 | 1.8 | 1.6 |
| 6 | 36.3 | 3.4 | 43.8 | 9.2 | 4.7 | 0.75 |

In the operation of the smelting furnace as described in Example 1, the air blast was preheated to a temperature of about 900° F. Lower blast temperatures are not considered satisfactory when using air as the main source of oxygen, but even higher blast temperatures are then desirable.

The air blast to the shaft furnace has sometimes been enriched with oxygen so that successful operation of the smelting furnace has been obtained with blasts containing from 21 to about 30 percent oxygen, although even higher oxygen contents may be desirable under some conditions.

In the operation of the smelting furnace as described in Example 1, metallurgical coke provided much of the thermal fuel for the furnace. It is recognized that in larger furnaces considerably less metallurgical coke may be required. Metallurgical coke plays two functions in the operation described in Example 1; (1) it serves as a heating fuel, and (2) it serves as a disappearing mechanical support and improves the permeability of the stock in the furnace to the passage of the air blast and resulting gases. Under some conditions, the use of metallurgical coke may be dispensed with entirely. For example, the thermal fuel requirement can be satisfied by using coal, char, and similar relatively inexpensive solid fuels as a substitute for high-priced metallurgical coke. Fuel oils can provide the necessary fuel when injected through the tuyeres with the air and/or oxygen. The function of the metallurgical coke in providing stock permeability is not required when larger pellets are used as described in Example 3, or when clustered conglomerates are used as described in Example 6.

An electric arc can be used in the smelting furnace as the source of heat necessary for reduction of the iron in the self-sufficient char-bonded material, to metallic iron. Under such conditions, metallurgical coke is not required either as a fuel or because of its value in increasing the permeability of the stock.

When the smelting furnace was operated with an air blast, or an air blast enriched with oxygen, two tuyere systems were used. In one form of practice, the tuyeres consisted of a ring of openings in the same horizontal plane. In another form, a second ring of tuyeres was added in a horizontal plane about 14 inches above the lower tuyeres. Both types of tuyere systems resulted in the reduction of large amounts of metallic iron.

The pellets as delivered into the smelting furnace can be of sizes from one-fourth of an inch up to an inch and a quarter. The range of sizes during a continuous operation of forming, first heating, and smelting is conditioned upon having the smallest size large and hence heavy enough relative to their superficial and cross sectional areas so that they are not elevated and blown out of the smelter stack at the blast rate being employed and upon having the largest size small enough so that the heating during drying and carbonizing does not cause explosion by reason of the sudden development of steam or gas pressure within the individual pellets and adequate heat transfer during the smelting operation so that a regular descent of the charge occurs. In the foregoing examples, the preference for size ranges of ⅜ to ⅝ inch, ⅝ to ⅞ inch, and ⅞ to 1 inch is based upon possibility of adjusting the blast rate and conditions over the stated ranges during the carbonizing and smelting, without significant loss into the stack or irregular descent. The stated ranges have volume ratios of about 1:5 for the small sizes; and 1:1.5 for the larger sizes where the bonded pellets are to be used with low or no coke as a scaffold, noting that there is less packing or flow-impedance when the pellets are of substantially the same size. In general, for the larger sizes the pellet bed in the first heating operation can be deeper, a higher blast rate employed, and a higher final grate temperature; and less coke need be employed as a support in smelting. With the smaller sizes, less time is required for drying before exposing the pellets to the first heating operation.

The bonded material from the first heating operation is characterized by a surprising strength and low loss by abrasion as pellets are rubbed together. Microscopic examination of sections and parts of the pellets indicates that the iron ore and reduced iron are present in discrete particles, and there is little or no bonding by fused ash components: the major and significant bonding is by a graphitic carbon matix. Thus the bonded pellets are distinct from sinter-bonded or glaze-bonded masses where connective bridges of fused slag components are present: but it is noteworthy that the pellets can be produced without employment of a coking coal as source of such carbon. A further significant fact is that such bonded pellets contain carbon in quantity to reduce and carburize the iron oxide present (e. g. "attained reducibility" of 100 to 170, and carbon percentage of 10 to 25), along with 9.2 to 31.4 percent of reduced iron (representing a reduction of 15 to 40 percent of the total iron). In many instances the strength, as indicated by "yield index" values, increased with the amount of metallic iron in particles although such particles were independent of one another. The bonded material is distinct from coke: which requires a coking coal or the like; does not contain iron oxides and metallic iron particles in significant amounts; and exhibits a characteristically porous rather than dense structure.

The examples given of satisfactory performance are illustrative of practices in accordance with this invention, but it will be understood that they are not inclusive of all practices, and that the invention can be employed in many ways within the scope of the appended claims.

I claim:

1. In the process of making iron, the steps of forming green pellets of a moistened mixture consisting essentially of iron oxide ore fines and fines of a carbonaceous reducing agent including volatiles, the amount of reducing agent having a carbon content in excess of that required to reduce the iron oxide of the ore, igniting a bed of the pellets and subjecting the same to a blast containing 16 to 26 percent of oxygen, regulating said blast to heat and to maintain the pellets at a temperature between 1600 and 2300 degrees F. and continuing said regulated blast until the iron of the oxide is partially reduced to produce a metallic iron content in the pellets of from about 15 percent to 40 percent by weight of total iron and terminating the blast while more than about 6.5 percent by weight of carbon is still present in the pellets, said carbon being in excess of that required for converting the iron of oxides present to elemental form, thereby destructively distilling the reducing agent and converting it to a graphitic matrix in the form of a char-bond for the other constituents of the pellets.

2. The process defined in claim 1 in which said carbonaceous reducing agent is a non-coking type of coal.

3. The process defined in claim 1 in which the green pellets are first subjected to heat for drying them, and are then ignited and subjected to said blast for a period of time not exceeding fifteen minutes after ignition of the bed of the pellets.

4. The process of making iron, which comprises the steps of mixing iron oxides fines and non-coking coal fines in a weight ratio between 85:15 and 50:50 in the presence of 10 to 20 percent of water, tumbling the mixture on a revolving surface in the presence of a water spray in amount of about 2 percent, whereby green pellets form and increase in size, removing the tumbling mass from the surface and separating therefrom particles smaller than one-fourth inch and returning the same for further tumbling, separating from the said mass particles larger than one and a quarter inches and breaking and returning the same for further tumbling, establishing a traveling bed of the remaining green pellets in a quiescent condition within the bed, and the bed having a depth of 3 to 5 inches, igniting the top of bed as it travels with the pellets in said quiescent condition and causing air containing 16 to 26 percent of oxygen and moving at a blast rate through the bed ranging from 25 to 101 cubic feet per minute per square foot of the bed being blown, to move downwardly through the bed for effecting combustion and heating at a heating rate effective, within a maximum time of 15 minutes, to expel the water as steam, and to destructively distill the coal within the pellets, and to carbonize the coal without explosion in the pellets while effecting partial reduction of the iron of the oxide to produce a metallic iron content in the pellets of from about 15 percent to 40 percent by weight of total iron and to produce a final temperature in the bed of 1600 to 2300 degrees F. whereby a bonding matrix of graphitic carbon is produced in each pellet, thereupon terminating the blast, and discharging the bonded pellets from the bed.

5. The process of claim 1 in which, upon termination of said regulated blast, the hot pellets are charged, before substantial cooling, directly into a reduction chamber with added fluxing ingredients, and are there subjected to further heat for completing reduction of the contained iron oxide and melting the iron therein, and forming a fluid slag.

6. A pellet, self-sufficient for reduction, made in accordance with the process of claim 1.

7. A pellet, self-sufficient, for reduction, made in accordance with the process of claim 1, and characterized by containing 40 to 55 percent by weight of total iron, about 15 to 40 per cent of the total iron being present as elemental iron and the remainder as iron oxide, the iron being present in discrete particles, and carbon in amount sufficient to reduce the iron oxide present, the carbon present including in excess of about 6.5 percent by weight of the pellet as a graphitic matrix in the form of a char-bond for the other constituents of the pellet, the pellet being dense, visually non-porous, and microscopically porous.

References Cited in the file of this patent

UNITED STATES PATENTS

| 801,129 | Arden | Oct. 3, 1905 |
| 2,543,898 | DeVaney | Mar. 6, 1951 |

FOREIGN PATENTS

| 5,568 | Great Britain | of 1893 |
| 11,083 | Great Britain | of 1891 |